(12) United States Patent
Kou et al.

(10) Patent No.: US 11,059,497 B2
(45) Date of Patent: Jul. 13, 2021

(54) SUSPENSION DEVICE FOR MONORAIL CRANE AND MONORAIL CRANE

(71) Applicant: TAIYUAN UNIVERSITY OF TECHNOLOGY, Shanxi (CN)

(72) Inventors: Ziming Kou, Shanxi (CN); Junxia Li, Shanxi (CN); Peng Zhang, Shanxi (CN); Haiqing Wang, Shanxi (CN); Pengfei Yin, Shanxi (CN); Qian Wang, Shanxi (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 16/744,248

(22) Filed: Jan. 16, 2020

(65) Prior Publication Data
US 2020/0198661 A1     Jun. 25, 2020

Related U.S. Application Data

(63) Continuation of application No. PCT/CN2018/104228, filed on Sep. 5, 2018.

(30) Foreign Application Priority Data

May 2, 2018 (CN) .......................... 201810411045.6

(51) Int. Cl.
*B61B 3/02* (2006.01)
*B61B 12/02* (2006.01)
(Continued)

(52) U.S. Cl.
CPC ................ *B61B 3/02* (2013.01); *B61B 12/02* (2013.01); *B61H 7/12* (2013.01); *E01B 25/24* (2013.01); *E21F 13/004* (2013.01); *E21F 13/006* (2013.01)

(58) Field of Classification Search
CPC B61B 12/02; B61B 3/02; B61B 13/04; B61B 13/02; B61B 3/00; B61B 10/02;
(Continued)

(56) References Cited

U.S. PATENT DOCUMENTS 5,398,617 A * 3/1995 Deandrea ................ B61B 13/02
                                                            105/29.1
5,664,502 A * 9/1997 Wilhelm
(Continued)

FOREIGN PATENT DOCUMENTS

CN     203005420 U     6/2013
CN     203624851 U     6/2014
(Continued)

*Primary Examiner* — Mark T Le

(57) ABSTRACT

Provided are a suspension device of a monorail crane and a monorail crane. The suspension device includes a suspension box and at least one set of suspension wheels; the suspension box is provided with a receiving groove for receiving at least one set of the suspension wheels; the receiving groove is provided with a first suspension wheel and a second suspension wheel; a first gap is formed the first suspension wheel and the second suspension wheel; the monorail includes at least a first track on which the first suspension wheel is placed and a second track on which the second suspension wheel is placed; a spacer is provided between the first track and the second track; the first gap can accommodate at least the spacer; the suspension devices each further includes a braking mechanism fixed to the suspension box.

6 Claims, 3 Drawing Sheets

(51) Int. Cl.
*B61H 7/12* (2006.01)
*E01B 25/24* (2006.01)
*E21F 13/00* (2006.01)

(58) Field of Classification Search
CPC .... B61B 7/06; B61H 7/12; B61H 9/00; E01B 25/24; E21F 13/004; E21F 13/006; B61C 13/04
USPC .......................................... 104/118, 121, 95
See application file for complete search history.

(56) References Cited

U.S. PATENT DOCUMENTS

| | | | |
|---|---|---|---|
| 7,739,960 B2 * | 6/2010 | Moll | ........................ B61C 13/04 105/155 |
| 2009/0025598 A1 * | 1/2009 | Menser, Jr. | ........ H01L 21/67733 104/93 |

FOREIGN PATENT DOCUMENTS

| | | | |
|---|---|---|---|
| CN | 203740886 U | | 7/2014 |
| CN | 104260744 A | | 1/2015 |
| CN | 104370210 A | | 2/2015 |
| CN | 106080648 A | | 11/2016 |
| CN | 106314474 A | | 1/2017 |
| CN | 107587393 A | | 1/2018 |
| CN | 108439202 A | | 8/2018 |
| DE | 101 55 996 | * | 6/2003 |
| DE | 20 2015 104 225 | * | 8/2015 |
| DE | 202015104225 U1 | | 8/2015 |
| JP | 62 221944 | * | 9/1987 |
| JP | H10129469 A | | 5/1998 |

* cited by examiner

SUSPENSION DEVICE FOR MONORAIL CRANE AND MONORAIL CRANE

CROSS-REFERENCE TO RELATED APPLICATIONS

This application is based on a Chinese patent application with an application number of 201810411045.6 and an application date of May 2, 2018, and claims the priority thereof. The entire content of this Chinese patent application is incorporated herein by reference.

TECHNICAL FIELD

The present disclosure relates to the technical field of suspension rail locomotives, and in particular to a suspension device for a monorail crane and a monorail crane.

BACKGROUND

A monorail crane is often used to transport goods and personnel in coal mine roadways, highway tunnels, railway tunnels and other special occasions. The main advantages of monorail crane transportation are: first, the monorail crane has a small cross section and high space utilization in the tunnel section; second, it can be used for continuous transportation without transshipment of flat and inclined lanes. Its transport load is not limited by the conditions of the floor, and it can run on various vertical, flat and complex curves; and third, it can achieve auxiliary transportation without transshipment from the parking lot to the working surface, and can be used for auxiliary transportation that connects the main transportation lanes and mining area lanes together.

However, current monorail cranes have problems such as complicated structure and low efficiency.

SUMMARY

In view of this, embodiments of the present disclosure are expected to provide a suspension device for a monorail crane and a monorail crane, which have a simple structure and high efficiency.

To achieve the above object, the technical solution of the present disclosure is implemented as follows:

The present disclosure provides a suspension device for a monorail crane, the suspension device comprises a suspension box and at least one set of suspension wheels; the suspension box is provided with a receiving groove for receiving at least one set of the suspension wheels; the receiving groove comprises a first side wall and a second side wall opposite to each other, the first side wall is provided with a first suspension bracket, the second side wall is provided with a second suspension bracket; a first suspension wheel in a set of at least one set of the suspension wheels is rotatably disposed on an inner side of the first side wall; a second suspension wheel in a set of at least one set of the suspension wheels is rotatably disposed on an inner side of the second side wall; a first gap is formed the first suspension wheel and the second suspension wheel; the monorail comprises at least a first track on which the first suspension wheel is placed and a second track on which the second suspension wheel is placed; a spacer is provided between the first track and the second track; the first gap can accommodate at least the spacer; the suspension devices each further comprises a braking mechanism fixed to the suspension box, the braking mechanism comprises braking pads, upon braking, the braking mechanism drives the braking pads to abut against the monorail, and braking is performed through friction between the braking pads and the monorail.

In the embodiment, the braking pads comprise a first braking pad and a second braking pad respectively disposed on both sides of the monorail, and upon braking, the braking mechanism drives the first braking pad and the second braking pad to abut against the spacer of the monorail from both sides of the monorail to perform braking.

In the embodiment, the braking mechanism further comprises a power member, the power member comprises a hydraulic cylinder and a connecting rod assembly, the hydraulic cylinder comprises two power output ends respectively connected to one end of each of the connecting rod assemblies, and the other end of each of the connecting rod assemblies is respectively connected to the braking pads.

The present disclosure further provides a monorail crane, comprising at least two suspension devices, a lifting container fixed under the two suspension devices, and a control device that controls the movement of the suspension devices; at least one of the at least two suspension devices is provided with at least one driving member connected to the suspension box; the control device is fixed below the suspension devices.

In the embodiment, the suspension box is further provided with a transmission member, one end of the transmission member is connected to the suspension wheel, and the other end passes through the suspension box and is connected to the driving member; the transmission member comprises a driving gear and a driven gear; the driving gear is connected to an output end of the driving member, and the driven gear is coaxial with the suspension wheel.

In the embodiment, the monorail is an inverted T-shaped guiding rail, the first rail is an upper surface of a bottom plate on one side of the inverted T-shaped guiding rail, and the second rail is an upper surface of a bottom plate on the other side of the T-shaped guiding rail.

In the embodiment, the inverted T-shaped guiding rail is composed of a plurality of inverted T-shaped profiles connected end to end, and the inverted T-shaped profiles each is provided at a top end with a lifting lug and at a bottom end a buckle structure connected with other inverted T-shaped profiles.

In the embodiment, the suspension devices each further comprises an actuating gear for increasing a motive power of the monorail crane on a ramp, the actuating gear is the driven gear, and the actuating gear is disposed on an outer side of the suspension wheel and is coaxial with the suspension wheel; the monorail is further provided with a rack gear that cooperates with the actuating gear, and the rack gear is disposed on an inner side of the inverted T-shaped guiding rail.

In the embodiment, the monorail crane further comprises a lifting beam, both ends of the lifting beam are respectively fixed below the at least two suspension devices, and the lifting container is fixed under the at least two suspension devices through the lifting beam.

In the embodiment, the driving member is a motor, and an output shaft of the motor is connected to the driving gear; the monorail crane further comprises a power supply device providing electric power to the driving member and the control device, and the power supply device is electrically connected to the driving member and the control device.

As to the suspension device of a monorail crane and the monorail crane provided by the embodiment of the present disclosure, two suspension wheels are directly placed on the monorail, and the outer circle of the suspension wheel is pressed against the monorail by the gravity of the monorail crane, so that no additional power device is required, that is, the suspension wheel rolls by friction. It is clear that the suspension device of the monorail crane according to the embodiment of the present disclosure has a simple structure and high efficiency.

Other beneficial effects of the embodiments of the present disclosure will be further described in specific implementations in combination with specific technical solutions.

DETAILED DESCRIPTION OF EMBODIMENTS

Figure 1:
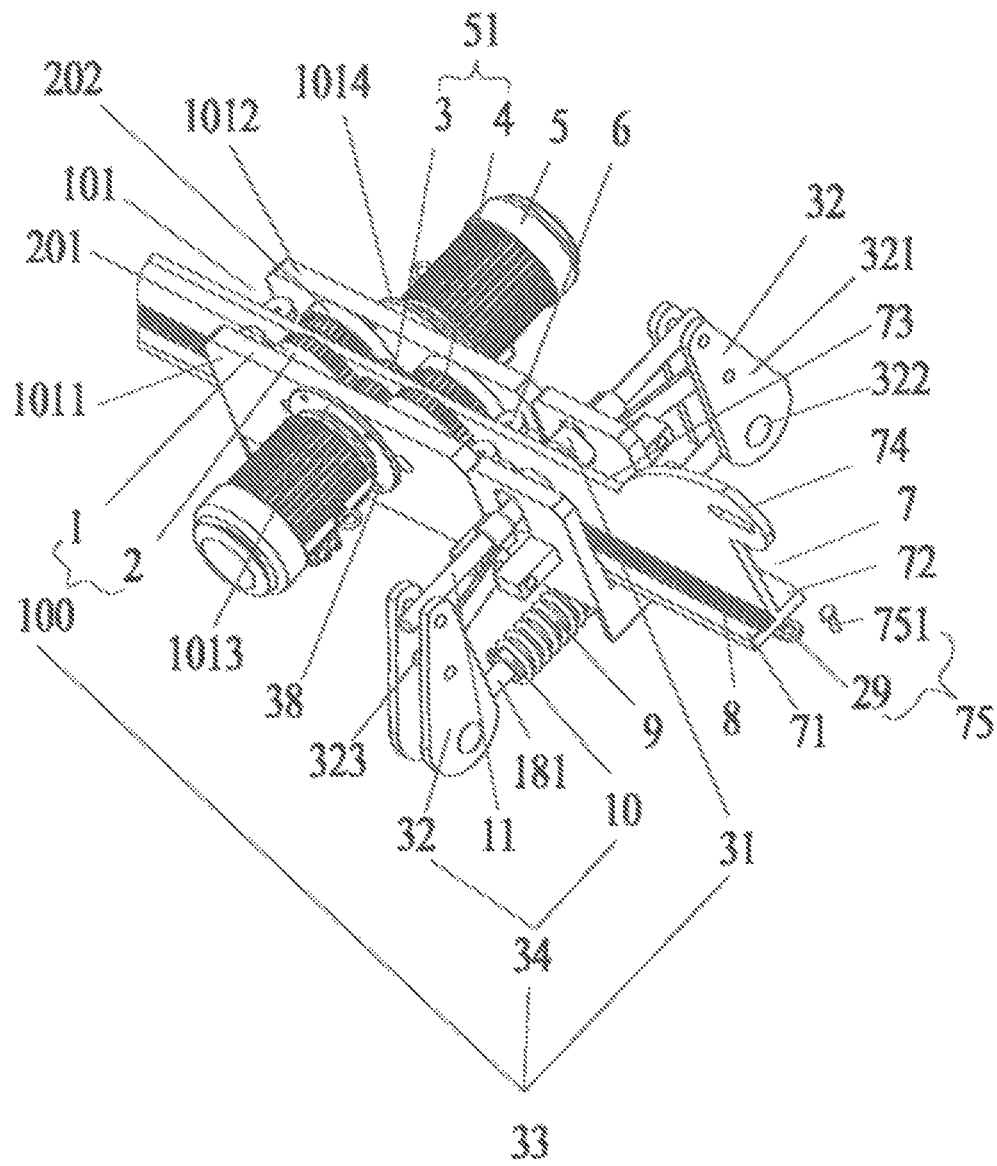
FIG. 1 is a schematic view of a suspension device of a monorail crane according to a first embodiment of the present disclosure.

An embodiment of the present disclosure provides a suspension device for a monorail crane, the suspension device comprises a suspension box and at least one set of suspension wheels; the suspension box 1 is provided with a receiving groove 101 for receiving at least one set of the suspension wheels 2; the receiving groove 101 comprises a first side wall 1011 and a second side wall 1012 opposite to each other, the first side wall 1011 is provided with a first suspension bracket 1013, the second side wall 1012 is provided with a second suspension bracket 1014; a first suspension wheel 201 in a set of at least one set of the suspension wheels 2 is rotatably disposed on an inner side of the first side wall 1011; a second suspension wheel 202 in a set of at least one set of the suspension wheels is rotatably disposed on an inner side of the second side wall 1012; a first gap 35 is formed the first suspension wheel 201 and the second suspension wheel 202; the monorail 7 comprises at least a first track 71 on which the first suspension wheel 201 is placed and a second track 72 on which the second suspension wheel 202 is placed; a spacer 73 is provided between the first track 71 and the second track 72; the first gap 35 can accommodate at least the spacer 73; the suspension devices 100 each further comprises a braking mechanism 33 fixed to the suspension box, the braking mechanism 33 comprises braking pads 31, upon braking, the braking mechanism 33 drives the braking pads 31 to abut against the monorail 7, and braking is performed through friction between the braking pads 31 and the monorail 7.

The principle of the embodiment of the present disclosure is that two suspension wheels 2 are directly placed on the monorail 7, and the outer circle of the suspension wheel 2 is pressed against the monorail 7 by the gravity of the monorail crane, so that no additional power device is required, that is, the suspension wheel rolls by friction. It is clear that the suspension device of the monorail crane according to the embodiment of the present disclosure has a simple structure and high efficiency.

In an implementation, the braking pads comprise a first braking pad 311 and a second braking pad 312 respectively disposed on both sides of the monorail, and upon braking, the braking mechanism 33 drives the first braking pad 311 and the second braking pad 312 to abut against the spacer 73 of the monorail 7 from both sides of the monorail to perform braking. In this way, the braking efficiency is high and the braking process is smooth.

In an implementation, the braking mechanism 33 further comprises a power member 34, the power member comprises a hydraulic cylinder 10 and a connecting rod assembly 32, the hydraulic cylinder 10 comprises two power output ends 181 respectively connected to one end of each of the connecting rod assemblies 32, and the other end of each of the connecting rod assemblies 32 is respectively connected to the braking pads 31. In this way, the structure is simple and the control is convenient.

An embodiment of the present disclosure further provides a monorail crane, comprising at least two suspension devices 100, a lifting container 200 fixed under the two suspension devices, and a control device 300 that controls the movement of the suspension devices; at least one of the at least two suspension devices 100 is provided with at least one driving member 5 connected to the suspension box 1; the control device 300 is fixed below the suspension devices 100. Because the suspension devices 100 are connected to each other, one of the plurality of suspension devices 100 being provided with a driving member 5 can push or pull the entire monorail crane to move. Of course, it is possible for each suspension device 100 to be provided with a driving member 5, so the motivation is better.

In an implementation, the suspension box is further provided with a transmission member 51, one end of the transmission member 51 is connected to the suspension wheel 2, and the other end passes through the suspension box 1 and is connected to the driving member 5; the transmission member 51 comprises a driving gear 3 and a driven gear 4; the driving gear 3 is connected to an output end of the driving member 5, and the driven gear 4 is coaxial with the suspension wheel 2. Generally, the number of teeth of the driving gear 3 is less than that of the driven gear 4, so that the driving member 5 drives the suspension wheel 2 through a reduction transmission, and therefore the suspension wheel 2 obtains a larger torque.

In an implementation, the monorail 7 is an inverted T-shaped guiding rail, the first rail 71 is an upper surface of a bottom plate on one side of the inverted T-shaped guiding rail, and the second rail 72 is an upper surface of a bottom plate on the other side of the T-shaped guiding rail. The T-shaped guiding rail comprises two tracks, and the middle spacer 73 is a straight plate, which is convenient for arranging the braking mechanism.

In an implementation, the inverted T-shaped guiding rail is composed of a plurality of inverted T-shaped profiles connected end to end, and the inverted T-shaped profiles each is provided at a top end with a lifting lug 74 and at a bottom end a buckle structure 75 connected with other inverted T-shaped profiles. In this way, a plurality of inverted T-shaped profiles can be connected to form a guiding rail with sufficient length.

In an implementation, the suspension devices 100 each further comprises an actuating gear for increasing a motive power of the monorail crane on a ramp, the actuating gear is the driven gear 4, and the actuating gear is disposed on an outer side of the suspension wheel 2 and is coaxial with the suspension wheel 2; the monorail 7 is further provided with a rack gear 8 that cooperates with the actuating gear, and the rack gear 8 is disposed on an inner side of the inverted T-shaped guiding rail. In this way, the monorail crane can increase the climbing ability by engaging the actuating gear with the rack 8 when going uphill, and can slow down the inertia when going downhill, making the monorail crane safer.

In an implementation, the monorail crane further comprises a lifting beam 28, both ends of the lifting beam 28 are respectively fixed below the at least two suspension devices 100, and the lifting container 200 is fixed under the at least two suspension devices 100 through the lifting beam 28. In this way, the lifting container 200 can be better fixed.

In an implementation, the driving member 5 is a motor, and an output shaft of the motor is connected to the driving gear 3; the monorail crane further comprises a power supply device 400 providing electric power to the driving member 5 and the control device 300, and the power supply device 400 is electrically connected to the driving member 5 and the control device 300. Specifically, the motor may be a permanent magnet motor. Compared with an electric excitation motor, a permanent magnet motor, especially a rare earth permanent magnet motor, has the characteristics of simple structure, reliable operation, small size, light weight, small loss, and high efficiency.

The present disclosure is further described in detail below with reference to the drawings and specific embodiments. It should be understood that the specific embodiments described herein are only used to explain the present disclosure and are not intended to limit the present disclosure.

It should be noted that in the description of the embodiments of the present disclosure, unless otherwise stated and limited, the term "connect" should be understood in a broad sense. For example, it can be an electrical connection, or the internal connection of two elements, or a direct connection, or indirect connection through an intermediate medium. For those of ordinary skill in the art, the specific meanings of the above terms can be understood according to specific situations.

It should be noted that the term "first\second\third" involved in the embodiment of the present disclosure merely distinguishes similar objects, and does not represent a specific ordering of the objects. It is to be understood that, "first\second\third" may be interchanged in a particular order or order, if allowed. It should be understood that the objects of the "first\second\third" distinction may be interchanged where appropriate, so that the embodiments of the present disclosure described herein can be implemented in an order other than those illustrated or described herein.

Embodiment One

Figure 4:
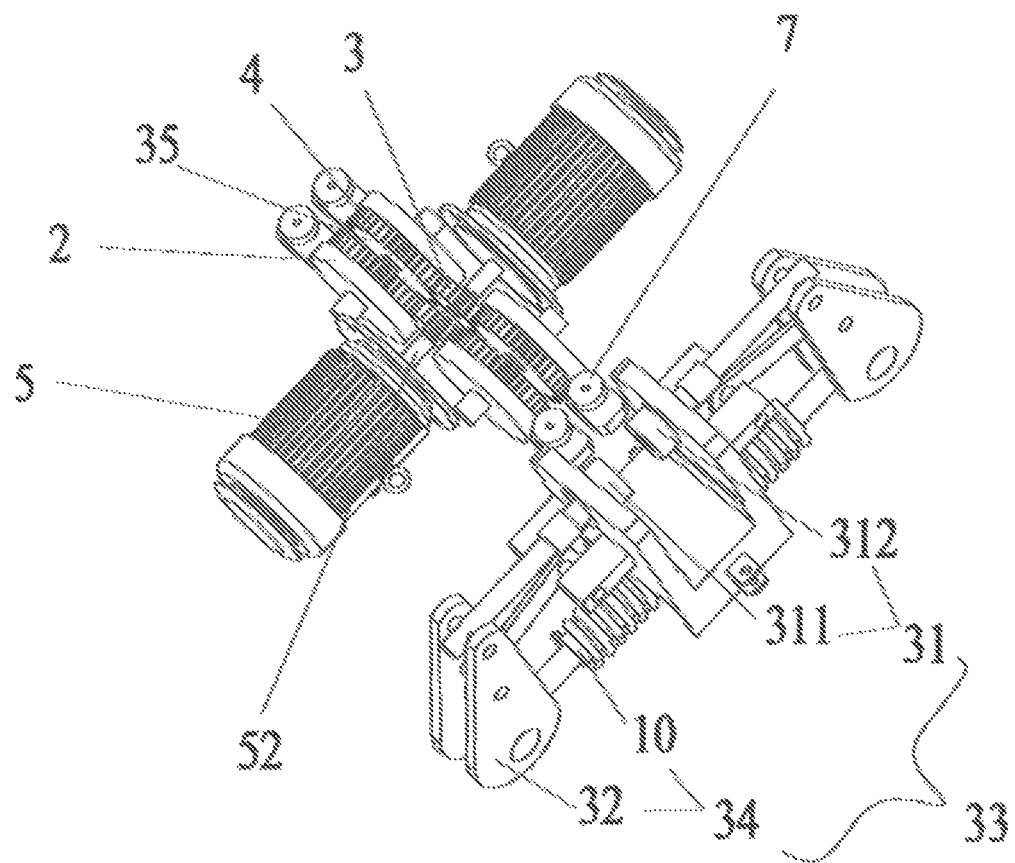
FIG. 4 is a partial structural view of a suspension device of a monorail crane according to the present disclosure.

FIG. 1 and FIG. 4 are schematic views of a suspension device of a monorail crane according to embodiment one of the present disclosure. As shown in FIG. 1, a suspension device 100 of a monorail crane comprises a suspension box 1, suspension wheels 2 and a braking mechanism 33; a receiving groove 101 with an opening facing upward is provided in the middle of the suspension box 1, and an inner side of each of a first side wall 1011 and a second side wall 1012 of the receiving groove 101 is provided with at least one of said suspension wheels 2.

The braking mechanism 33 comprises two braking pads 31 provided on both sides of the monorail 7, and may further comprise a power member 34 that pushes the braking pads 31 against the spacer 73. The purpose of the braking pads 31 provided on both sides of the monorail is that, during braking, the monorail will not be deformed or damaged due to the force on one side, and the braking efficiency is high and the braking process is stable.

In an implementation, the installation direction of the suspension wheel 2 is set as follows: the outer circle of the suspension wheel 2 can press the monorail 7 under the action of the gravity of the monorail crane. In this way, no additional power supply device is needed to press the suspension wheels 2 on the monorail, that is, the suspension wheels roll by friction.

In an implementation, the receiving groove 101 of the suspension box 1 may be installed with four of the suspension wheels 2, two on each side, so that the entire monorail crane moves smoothly and the structure is not too complicated.

In an implementation, the power member 34 comprises a hydraulic cylinder 10 and two connecting rod assemblies 32 corresponding to two braking pads 31, respectively. The hydraulic cylinder 10 comprises two power output ends, namely, piston rods 181. The piston rods 181 each is connected with one end of two connecting rod assemblies 32, and the other ends of the connecting rod assemblies 32 are respectively connected to the braking pads 31. In this embodiment, the connecting rod assembly 32 comprises a pear-shaped plate 321, and three holes 322 are opened on the pear-shaped plate. The two ends are respectively connected to the power output end of the hydraulic cylinder 10 and the braking pad 31, with a rotation fulcrum shaft 323 for the connecting rod assembly 32 therebetween. In an implementation, the connecting rod assembly 32 is connected to the braking pads 31 through a brake lever 11.

In an implementation, a compression spring 9 is also provided at the end of the piston rod 181 of the hydraulic cylinder 10. When the hydraulic cylinder 10 is powered off or fails, the compression spring 9 will push the connecting rod assembly 32 to rotate, and further push the braking pad 31 to brake, that is, when the monorail crane moves normally, the compression spring 9 is compressed by the hydraulic cylinder 10, and the braking pad 31 moves away from the monorail.

In an implementation, the suspension box 1 is further provided with a blocking wheel 6 for limiting the position of the suspension device 100 relative to the monorail 7. When the suspension device 100 of the monorail crane is moving, especially when turning, the suspension device 100 may tilt to both sides. In this way, the contact between the suspension wheels 2 and the monorail 7 will change from surface contact to line contact, so that the crane may move erratically and the suspension wheel 2 may be easily damaged. However, with the blocking wheel 6, when the suspension wheel 6 is tilted, its outer circular surface will bear against the monorail, preventing further tilt of the suspension device.

Embodiment Two

Figure 2:
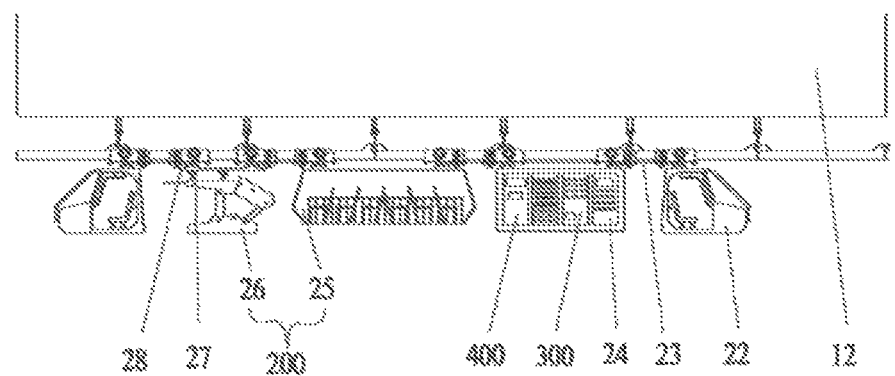
FIG. 2 is a schematic view of a monorail crane according to a embodiment two of the present disclosure.

FIG. 2 and FIG. 4 are schematic views of a monorail crane according to embodiment two of the present disclosure. As shown in FIG. 2, the monorail crane comprises the suspension device 100 of the monorail crane according to embodiment one, a lifting container 200 fixed under the two suspension devices and a control device 300 that controls the movement of the suspension device. At least one suspension device 100 of the at least two suspension devices is provided with at least one driving member 5 that is connected to the suspension box 1. The control device 300 is fixed below the suspension devices. Because the suspension devices 100 are connected to each other, one of the plurality of suspension devices being provided with a driving member 5 can push or pull the entire monorail crane to move. Of course, each suspension device can also be provided with a driving member, so that the motivation is better.

In this embodiment, the lifting container 200 may be a hydraulic bracket 26 and a passenger compartment 25.

The driving member 5 is disposed on the outer wall of the suspension box 1. The monorail 7 is located in the receiving groove 101 of the suspension box 1, and is used for carrying movement of the monorail crane on the suspension wheel 2 through the suspension wheel 2 through the.

In an implementation, four suspending wheels 2 are installed in the receiving groove of the suspension box 1, and the number of the driving members 5 is two. Each of the driving members 5 drives two of the suspension wheels 2 via the transmission member 51 provided in the suspension box 1. In this way, the entire monorail crane moves smoothly and the structure is not too complicated.

In an implementation, a transmission member 51 is further provided in the suspension box 1, one end of the transmission member 51 is connected to the suspension wheel 2, and the other end is connected to the driving member 5 through the suspension box 1.

In an implementation, the transmission member 51 comprises a driving gear 3 and two driven gears 4; the driving gear 3 is connected to the output shaft 52 of the driving member 5, and the driven gear 4 is connected to the axle of the suspension wheel 2. In an implementation, the two driven gears 4 may be symmetrically disposed on both sides of the driving gear 3 so that the power transmission is more balanced.

In this embodiment, the number of teeth of the driving gear 3 is less than the number of teeth of the driven gear 4, so that the driving member 5 drives the suspension wheel 2 through a reduction transmission, and therefore the suspension wheel 2 obtains a larger torque.

In an implementation, the monorail 7 is an inverted T-shaped guiding rail; the inverted T-shaped guiding rail is composed of a plurality of inverted T-shaped profiles connected end to end, and the inverted T-shaped profiles are provided with a lifting lug 74 at the top end and buckle structure 75 at the bottom end connected with the inverted T-shaped profiles. The lifting lugs 74 are used for fixing to the top 12 of the mine roadway, and the buckle structure is used for fixing the front and rear inverted T-shaped profiles to ensure that the inverted T-shaped guiding rails are integrated.

In this embodiment, the lifting lug can also play a role of fixing the front and rear inverted T-shaped profiles. As shown in FIG. 1, one end of the inverted T-shaped profile is provided with a left lifting lug (not shown in the FIG.), and the other end is provided with a right lifting lug. The left and right lifting lugs both protrude outward in the length direction of the inverted T-shaped profiles. In this way, when the front and rear inverted T-shaped profiles are connected, the left and right lifting lugs can be fixed to each other;

In an implementation, the buckle structure 75 comprises a snap pin 751 and a snap ring 29. When the front and rear inverted T-shaped profiles are connected, the snap pin 751 is inserted into the snap ring 29.

In an implementation, the suspension box 1 further comprises an actuating gear. In this embodiment, the actuating gear is the driven gear 4, and the actuating gear and the suspension wheel 2 are installed on the same axle. In this way, the monorail crane can improve the climbing ability by engaging the actuating gear with the rack 8 on the guiding rail when going uphill, and can reduce the inertia undershoot when going downhill, making the monorail crane safer. Further, the driven gear 4 is used as the actuating gear to simplify the structure.

In an implementation, the inverted T-shaped guiding rail further comprises a rack 8 matched with the driving gear, and the rack 8 is provided on a guiding surface of the inverted T-shaped guiding rail matched with the suspension wheel 2. The rack 8 is arranged on an uphill section of the inverted T-shaped guiding rail or a downhill section of the inverted T-shaped guiding rail and cooperates with the actuating gear of the suspension device 100 to improve the climbing ability or slow down the speed when going downhill to make the monorail crane safer. In order to ensure that the actuating gear meshes well with the rack 8, the rack 8 is fixed on the guiding surface of the inverted T-shaped guiding rail. In this way, when the actuating gear meshes with the rack 8 on the guiding rail, the suspension wheel 2 is not in contact with the guiding surface of the inverted T-shaped guiding rail.

In an implementation, the bottom end of the monorail suspension device is provided with a hydraulic support 26 and a lifting beam 28 for a passenger compartment 25. The lifting beam 28 is fixed on two suspension devices. It can be understood that the lifting beam 28 may also be fixed on one suspension device 100 or connected with multiple suspension devices 100 at the same time. In addition, the lifting beam 28 lifts the cargo by a lifting device 27, which may be a hydraulic hoist or the like. To ensure no interference between each suspension device 100, the monorail crane is fixed with a connecting rod 23 between each suspension device 100, and both ends of the connecting rod 23 are connected to the suspension box 1.

In an implementation, the driving member 5 may be a motor, and the motor is fixed to the driving case 1 by a bolt 30.

In an implementation, the motor may be a permanent magnet motor. Compared with an electric excitation motor, a permanent magnet motor, especially a rare earth permanent magnet motor, has a simple structure and reliable operation, small size, light weight, small loss, and high efficiency.

In an implementation, the monorail crane further comprises a power supply device 400 for supplying power to the driving member 5 and the control device 300, and the power supply device 400 is electrically connected to the driving member 5 and the control device 300. In an implementation, the control device 300 and the power supply device 400 of the monorail crane are disposed in a relatively closed box 24 and fixed on the suspension device 100 on one side of the cab 22.

In an implementation, the control of the entire monorail crane may be distributed control, and each driving member 5 has a separate control module. The control module controls the driving member 5 according to an instruction of the control device.

In an implementation, the control device may be a computer with a motor control adapter.

Figure 3:
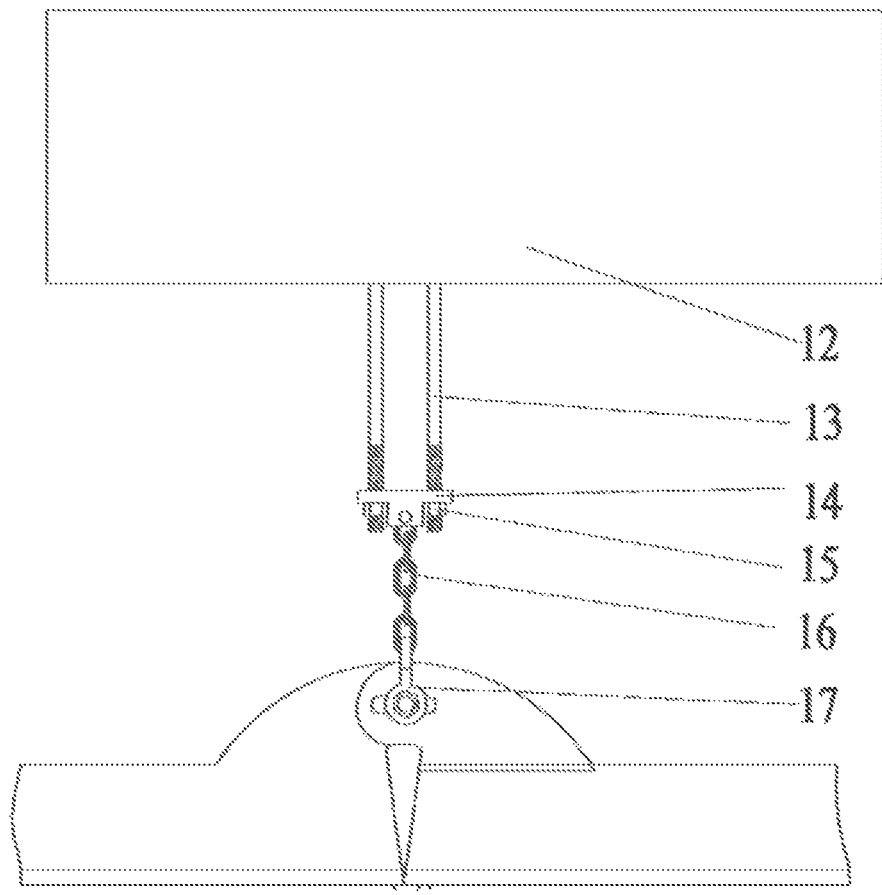
FIG. 3 is a schematic view of an inverted T-shaped guiding rail fixed to an underground roadway in a monorail crane according to a embodiment two of the present disclosure.

FIG. 3 is a schematic view of an inverted T-shaped guiding rail fixed to an underground roadway in a monorail crane according to embodiment one of the present disclosure. As shown in FIG. 3, the monorail crane is fixed to the roadway top 12 through an anchor rod 13 and a chain link 16. The anchor rod 13 and the chain wheel 16 are fixed together by a suspension plate 14 and an anchor nut 15, and the chain wheel 16 is fixed on the inverted T-shaped guiding rail by a U-shaped ring 17.

The above description is only the preferred embodiments of the present disclosure, and is not intended to limit the protection scope of the present disclosure. Any modification, equivalent replacement, and improvement made within the spirit and principle of the present disclosure shall be comprised within the scope of the present disclosure.

INDUSTRIAL APPLICABILITY

As to the suspension device of a monorail crane and the monorail crane provided by the embodiment of the present disclosure, two suspension wheels are directly placed on the monorail, and the outer circle of the suspension wheel is pressed against the monorail by the gravity of the monorail crane, so that no additional power device is required, that is, the suspension wheel rolls by friction. It is clear that the suspension device of the monorail crane according to the embodiment of the present disclosure has a simple structure and high efficiency.

What is claimed is:

1. A monorail crane, comprising at least two suspension devices, a lifting container fixed under the two suspension devices, and a control device that controls the movement of the suspension devices; the suspension devices each comprises a suspension box and at least one set of suspension wheels; at least one of the at least two suspension devices is provided with at least one driving member connected to the suspension box; the control device is fixed below the suspension devices;

the suspension box is provided with a receiving groove for receiving at least one set of the suspension wheels; the receiving groove comprises a first side wall and a second side wall opposite to each other; the first side wall is provided with a first suspension bracket, and the second side wall is provided with a second suspension bracket; the first suspension bracket and the second suspension bracket are parallel to the first side wall and the second side wall; the at least one driving member is arranged on an outer side of the first side wall through the first suspension bracket, and/or on an outer side of the second side wall through the second suspension bracket; a first suspension wheel in a set of at least one set of the suspension wheels is rotatably disposed on an inner side of the first side wall; a second suspension wheel in a set of at least one set of the suspension wheels is rotatably disposed on an inner side of the second side wall; a first gap is formed between the first suspension wheel and the second suspension wheel; the monorail comprises at least a first track on which the first suspension wheel is placed and a second track on which the second suspension wheel is placed; a spacer is provided between the first track and the second track; the first gap can accommodate at least the spacer; the suspension devices each further comprises a braking mechanism fixed to the suspension box, the braking mechanism comprises braking pads, upon braking, the braking mechanism drives the braking pads to abut against the monorail, and braking is performed through friction between the braking pads and the monorail;

wherein the suspension box is further provided with a transmission member; the transmission member comprises a driving gear and a driven gear; the driving gear is connected to an output end of the driving member, and the driven gear is coaxial with the suspension wheel; the number of teeth of the driving gear is less than the number of teeth of the driven gear;

the monorail is an inverted T-shaped guiding rail having the spacer with a top side surface, the first track is an upper surface of a bottom plate on one side of the inverted T-shaped guiding rail, and the second track is an upper surface of a bottom plate on the other side of the T-shaped guiding rail; and a gear rack is provided on an inner side of the inverted T-shaped guiding rail; and the gear rack engages with the driven gear.

2. The monorail crane according to claim 1, wherein the inverted T-shaped guiding rail is composed of a plurality of inverted T-shaped profiles connected end to end, and the inverted T-shaped profiles each is provided at a top end with a lifting lug and at a bottom end a buckle structure connected with other inverted T-shaped profiles.

3. The monorail crane according to claim 1, wherein the monorail crane further comprises a lifting beam, both ends of the lifting beam are respectively fixed below the at least two suspension devices, and the lifting container is fixed under the at least two suspension devices through the lifting beam.

4. The monorail crane according to claim 1, wherein the driving member is a motor, and an output shaft of the motor is connected to the driving gear; the monorail crane further comprises a power supply device providing electric power to the driving member and the control device, and the power supply device is electrically connected to the driving member and the control device.

5. The monorail crane according to claim 1, wherein the braking pads comprise a first braking pad and a second braking pad respectively disposed on both sides of the monorail, and upon braking, the braking mechanism drives the first braking pad and the second braking pad to abut against the spacer of the monorail from both sides of the monorail to perform braking.

6. The monorail crane according to claim 1, wherein the braking mechanism further comprises a power member, the power member comprises a hydraulic cylinder and two connecting rod assemblies, the hydraulic cylinder comprises two power output ends respectively connected to one end of the two connecting rod assemblies, and the other end of the two connecting rod assemblies is respectively connected to the braking pads.

* * * * *